United States Patent [19]
Kauffman et al.

[11] Patent Number: 6,020,012
[45] Date of Patent: Feb. 1, 2000

[54] METHOD OF IMPROVING THE WATER-HOLDING CAPACITY, COLOR, AND ORGANOLEPTIC PROPERTIES OF BEEF, PORK, AND POULTRY

[75] Inventors: Robert G. Kauffman, Madison; Marion L. Greaser, Middleton, both of Wis.; Edward Pospiech, Paznan, Poland; Ronald L. Russell, Brooklyn, Wis.

[73] Assignee: Wisconsin Alumni Research Foundation, Madison, Wis.

[21] Appl. No.: 08/869,790

[22] Filed: Jun. 5, 1997

Related U.S. Application Data

[60] Provisional application No. 60/019,291, Jun. 7, 1996.
[51] Int. Cl.$^7$ ...................................................... A23L 1/318
[52] U.S. Cl. ........................... 426/281; 426/332; 426/641
[58] Field of Search ................................... 426/281, 641, 426/332

[56] References Cited

U.S. PATENT DOCUMENTS

| | | | |
|---|---|---|---|
| 4,543,260 | 9/1985 | Brotsky | 426/266 |
| 4,818,548 | 4/1989 | Cheng | 426/265 |
| 5,069,922 | 12/1991 | Brotsky et al. | 426/332 |
| 5,436,017 | 7/1995 | Ludwig et al. | 426/281 |
| 5,489,443 | 2/1996 | Knipe et al. | 426/264 |

FOREIGN PATENT DOCUMENTS

| | | |
|---|---|---|
| B-66420/86 | 6/1987 | Australia . |
| 0 028 113 A2 | 5/1981 | European Pat. Off. . |
| 0 209 268 A2 | 1/1987 | European Pat. Off. . |
| 55-054854 | 4/1980 | Japan . |

OTHER PUBLICATIONS

Francis et al., Effect of Sodium bicarbonate on the quality of pork, *Meat Focus International*, Nov. 1996, pp. 392–393.
Ahn et al. (1992), *Meat Sci.*, 32:65.
Bennett et al. (1973), *J. Food Sci.*, 38:536.
Boles et al. (1993), *J. Food Sci.*, 58:1254.
Boles et al. (1994), *Meat Sci.*, 37:181.
Greer and Murray (1988), *Meat Sci.*, 24:61.
Hamm (1975), "Water–Holding Capacity of Meat," in *Meat*, Cole and Lawrie eds., p. 321.
Honkavaara (1988), *Meat Sci.*, 24:201.
Jeremiah (1984), *Can. J. of Anim. Sci.*, 64:773.
Kauffman et al. (Aug. 16, 1996), "Assessing Annual Definable and Potential Monetary Losses Due to Quality Problems in the U.S. Pork Industry," unpublished study of the University of Wisconsin Meat Science and Muscle Biology Laboratory.
Kauffman et al., (1978), *J. of Anim. Sci.*, 46:1236.
Kauffman et al. (1992), Variations in pork quality. A National Pork Producers Council Publication.
Offer and Knight, (1988), *Developments in Meat Science*, 4:173.
Smith and Lesser (1982), *Animal Production*, 34:291.
Topel et al. (1976), *J. of Food Sci.*, 41:628.
van Laack et al. (1994), *Meat Sci.*, 38:193.
Voon, (1991), *J. Agr. Econ.*, 42:180.
Wachholz et al. (1978), *J. of Food Sci.*, 43:1150.
Warner et al. (1993), *Meat Sci.*, 33:359.
Warriss and Brown (1987), *Meat Sci.*, 20:65.
Wismer–Pederson (1987), *Science of Meat and Meat Products*, 3rd Ed., Food and Nutrition Press, Westport, Connecticut.

*Primary Examiner*—Arthur L. Corbin
*Attorney, Agent, or Firm*—DeWitt Ross & Stevens SC

[57] ABSTRACT

A method of improving the color, water-holding capacity, and organoleptic qualities of beef, pork, lamb, veal, and poultry by injecting or perfusing a solution of sodium bicarbonate into a carcass is disclosed.

11 Claims, No Drawings

METHOD OF IMPROVING THE WATER-HOLDING CAPACITY, COLOR, AND ORGANOLEPTIC PROPERTIES OF BEEF, PORK, AND POULTRY

This application claims priority to co-pending provisional patent application Ser. No. 60/019,291, filed Jun. 7, 1996.

This invention was made with United States government support awarded by the USDA, Hatch No. 3673. The United States has certain rights in this invention.

FIELD OF THE INVENTION

The present invention is drawn to a method of improving the water-holding capacity (WHC), color, and organoleptic properties of fresh meats, including beef, pork, amd poultry, by injecting an early post-mortem, pre-rigor carcass with one or more solutions which serve to reduce the rate and extent of pH decline of the meat on the carcass.

BACKGROUND

Consumers purchase meat products after making judgments about the quality and price of the meat. Consumers often use color to judge the ultimate tenderness and taste of the meat product. However, such quality attributes are very difficult to quantify from visual appraisal.

For purposes of this application, the term "meat(s)" or "meat product(s)" are synonymous and refer to the processed cuts of meat offered to the wholesale and retail buying public.

Because most meat products, and fresh meats in particular, are purchased based upon a visual inspection of the product, abnormal coloration has an adverse effect on the salability of the product (Topel et al., 1976; Wachholz et al., 1978). Moreover, pale pork is more susceptible to further discoloration during retail display (Topel et al., 1976; Greer and Murray, 1988).

While the discussion which follows is largely limited to pork, this limitation is for brevity only. The invention described hereinbelow functions with equal success in the treatment of poultry, such as chickens, turkeys, and the like, as well as beef, lamb, and veal.

In order to more objectively judge pork quality, four categories have been developed to describe the visual appearance of fresh pork. These four categories are described in Table 1 as follows (see, for instance, Joo, 1994):

TABLE 1

| Category | Description | Quality | pH | Percent Drip |
|---|---|---|---|---|
| RFN | Reddish pink, Firm, Non-exudative | Ideal | <6.0 | <6.0 |
| RSE | Reddish pink, Soft and floppy, Exudative | Questionable | <6.0 | >6.0 |
| PSE | Pale pinkish gray, very Soft and floppy, very Exudative | Poor | <6.0 | >6.0 |
| DFD | Dark purplish red, very Firm, Dry (free of surface fluids) | Varied: may be juicy, spoil easily | >6.0 | <3.0 |

It is known that a rapid fall in pH within pork immediately postmortem, while muscle temperature remains high, results in acidic conditions which give rise to lower quality PSE meat. This effect is most notable in the loins and hams. This rapid fall is believed to be the result of rapid glycolysis of glycogen in muscles which results in denaturation of proteins. The occurrence of PSE is known to be affected by pre-slaughter stress as well as the genetic makeup of the pig. The occurrence of lower quality PSE meat has risen as pigs have been bred to yield leaner carcasses.

From an economic standpoint, PSE meat represents a tremendous loss in value to pork producers because the loins and hams of a slaughtered pig represent approximately one-third of the musculature on the carcass and approximately one-half of the market value of the carcass. Lowered quality of these important cuts of meat greatly reduces the economic return to pork producers and packers.

A 1992 survey of pork quality published by the National Pork Producers Council (NPPC) included data from fourteen slaughtering plants and represented 10,753 gluteus medius muscles (hams). The survey found 16 percent of these hams to be PSE and 10 percent to be DFD pork, proportions the NPPC felt should be of concern to the industry. Importantly, over half of the hams were RSE, possessing normal color, but accompanied by a soft, floppy, and exudative condition. The NPPC recommended, among other things, that color, water-holding capacity, pH, and marbling content be recorded for each carcass and included in every packer report to producers, so that the industry can remain informed of quality variations and can take appropriate steps to improve breeding stock. The NPPC also recommended the adoption of price differentials for differences in quality, similar to those which exist for leanness. These results and recommendations stress a long-felt need to better understand the problem of PSE-RSE so that it can be controlled, predicted, and prevented.

As alluded to above, the economic losses associated with the occurrence of PSE and RSE pork are extensive. Direct costs include reduced yields in the carcass, as well as reduced yields in wholesale and retail cuts used for processing and cooking. Indirect costs include an increase in product variability and a reduction in consumer appeal due to poor color, drip loss in retail display (Kauffman et al., 1978; Smith and Lesser, 1982), variation in organoleptic qualities in cooked hams (Honkavaara, 1988), and reduced juiciness after cooking (Bennet et al. 1973; Jeremiah, 1984).

In 1982, the reduced financial return of a PSE carcass was calculated to range from zero to $16 in the U.K. (Smith and Lesser, 1982). The benefits of lowering the incidence of PSE pork by only 1% were estimated to be worth about $5 million per annum to the Australian pig industry, with 85% of the returns accruing to producers (Voon, 1991). The Pork Chain Quality Audit (Meeker and Sonka, 1994) suggests that pork quality problems currently are costing the industry in excess of $50 million per annum. A similar study by Kaufmann et al. (1996, unpublished), estimates that pork quality problems in the U.S. result in lost revenues of approximately $75 to $140 million annually (1996 dollars).

The water-holding capacity (WHC) of fresh pork and the binding of added water during storage and further processing are also of significance to the pork industry. Water retention is essential for pork palatability in terms of juiciness and possibly tenderness. Furthermore, loss of fluids (often in excess of 7%) results in a reduction in the weight of marketable pork. The occurrence of a pale color and high exudation or a dark color and minimal exudation has led to the assumption that color and WHC are related. However, van Laack et al. (1994) and Warriss and Brown (1987) have demonstrated that color and WHC are not necessarily related, especially within the reddish-pink range (RFN, RSE).

Fresh pork at slaughter contains about 75% water, and about 85% of this muscle tissue water is located intracellularly, primarily in the spaces between the thick and thin filaments. The remaining 15% of the water in fresh pork is located in the extracellular spaces (Hamm, 1975).

Changes in WHC result from changes of the filament spacing associated with changes in the charge and structure of the myofibrillar proteins, especially myosin. Swelling or shrinkage of the muscle fiber results in changes in the filament spacing and causes water movement between the intracellular and extracellular spaces (Offer and Knight, 1988). During the conversion of muscle to pork and subsequent aging of pork, the interfilament spacing can be changed by the rate and extent of pH fall, sarcomere length, ionic strength, osmotic pressure and onset of rigor mortis (Hamm, 1994; Offer and Knight, 1988; Wismer-Pederson, 1987).

The occurrence of PSE is known to be affected by antemortem factors such as pre-slaughter stress and the genetic makeup of the individual animal. The PSE condition is more likely to arise in white muscles, i.e. those muscles which have predominantly white fibers. These fibers have the capacity to undergo rapid postmortem glycolysis (pH decline) especially when there is antemortem stress (Warner et al., 1993). As noted above, the pork muscles that are subject to the PSE condition comprise approximately one-third of the total muscle mass.

Recent studies by Ahn et al. (1992), Boles et al. (1993; 1994) and Grzes et al. (1994) indicate that minute quantities of sodium bicarbonate (baking soda) have an elevating and stabilizing effect on the ultimate pH of muscle. However, it must be also noted that sodium bicarbonate was not effective when administered to live pigs prior to slaughter (Boles et al., 1994).

DETAILED DESCRIPTION OF THE INVENTION

The present inventors have found that injecting or perfusing a solution of sodium bicarbonate into a swine, poultry or beef carcass, preferably during the pre-rigor condition after slaughter, improves the appearance, water-holding capacity (WHC) and oganoleptic quality of pork, and the organoleptic qualities of poultry and beef. In pork, the treatment greatly inhibits the formation of PSE and RSE meat. The invention functions with equal success in beef and poultry, although the invention is preferably practiced in the processing of pork.

In practice, implementing the present invention is straightforward. In a first embodiment of the present invention, immediately after stunning, bleeding and eviscerating the animal, the carcass is skinned and defatted and the pre-rigor musculature is injected with a sodium bicarbonate solution. Ideally, the sodium bicarbonate solution is injected or perfused into the carcass before the onset of rigor mortis.

For storage purposes, the carcass is then either chilled at 4° C. or crust chilled at −15° C. until the meat reaches a core temperature of 4° C.

Injection of the carcass can be accomplished using any number of commercially available injection devices. Such devices are well known to those skilled in the field of meat processing. A typical device includes a pressurized reservoir to contain the solution. The reservoir is then connected by suitable conduit means to a valve-controlled injector head bearing one or more hollow injector needles.

A second embodiment of the present invention comprises perfusing the carcass, preferably before rigor mortis, with a sodium bicarbonate solution. In pork, the perfusion is preferably performed via the iliac artery, which forces the solution into the pelvic limbs. In poultry and beef, the perfusion can be through any major blood vessel which affords perfusion to the majority of meat on the carcass.

For any carcass treated, pork, poultry, beef, or lamb, the sodium bicarbonate solution preferably has a concentration of between about 0.1 molar and 1.0 molar. More preferably still, the solution has a concentration of between about 0.2 and 0.4 molar sodium bicarbonate.

Optionally, a NaCl concentration of less than 1.0% may be added to the solution. Further ingredients, such as sodium pyrophosphate, may also be injected into the carcass simultaneously with the sodium bicarbonate.

The carcass may optionally be tumbled after the treatment in order afford more uniform distribution of the solution throughout the musculature. Tumbling apparatus is widely used in the meat-processing industry and is well known to those skilled in the art.

Commercial Applications and Advantages

Pork

Over 95 million pigs are slaughtered each year in the United States alone. European producers, especially in Denmark and The Netherlands, have taken steps to minimize variations in pork quality. The U.S. pork industry seems to have moved pork quality to the fore after the publication in 1995 of an NPPC evaluation of terminal-sire lines. That study showed that the U.S. industry suffers losses, both at the processor level and at the retail meat case, from substandard pork. The Japanese, who rely almost exclusively on imported pork, generally no longer accept PSE pork. This economic incentive appears to be driving U.S. industry to take steps to insure a high-quality product. By improving the quality of pork for human consumption, economic gains can be realized.

Additionally, a distinct advantage of using sodium bicarbonate is that sodium bicarbonate has been afforded "Generally Regarded as Safe" (GRAS) status by the U.S. government. Consequently, the treatment itself uses only compounds which are known to be safe for human consumption and which do not require further regulatory clearance.

The present invention is quite simple and can be optimized to accommodate the methods currently used in pork processing. Also, in pork, the method can be selectively used to treat only those carcasses identified to be at risk of becoming PSE.

Poultry and Beef

In poultry and beef, the main advantage afforded by the present invention is an increase in the beneficial organoleptic qualities of the salable meat product. The maintenance of a higher ultimate pH within the carcass as a result of the treatment appears to be a major factor in the favorable organoleptic results (although Applicants do not wish to be bound by this mechanistic interpretation).

In the same fashion as pork, it appears that a market-driven move toward producing leaner poultry and beef carcasses has resulted in an overall loss of meat product quality. By improving the organoleptic qualities of these meat products, producers can realize gains by reducing the proportion of their meat products which are judged by consumers to be of lower grade.

EXAMPLES

The following Examples are included herein solely to illustrate the practice of the present invention. The Examples do not limit the scope of the invention disclosed and claimed herein in any fashion.

Example 1

Select homozygous positive and heterozygous PSS (for the halothane gene) market-weight hogs are used in the studies. This ensures that the PSE and RSE conditions are available to be appropriately tested by the Example.

20 pigs are used for each treatment. Antemortem stress is minimized and conventional slaughtering and chilling conditions are used for controls. One side or limb of each pre-rigor carcass is used for experimental purposes, while the other side or limb is left untouched and processed simultaneously. This allows the right and left sides (or limbs) of each individual animal to serve as either controls or treatments:

A. Control: No additives, no defatting and normal chilling at 4° C. for 24 hours.

B. Ham-loin location skinned and defatted, chilled (crust-frozen) at −15° C. with maximum air velocity until center of ham reaches 4° C.

C. Immediately after evisceration (about 30 min), a dilute solution of sodium bicarbonate is injected into the loin (longissimus thoracis et lumborum) and ham (semimembranosus, semitendinosus, biceps femoris, and gluteus medius). The sides are chilled at 4° C.

D. (Combination of treatments B & C.) Immediately after stunning, bleeding and evisceration, one side of the carcass is skinned and defatted over the loin and ham and the musculature is injected with sodium bicarbonate and then either chilled at 4° C. for 24 hr or crust chilled at −15° C. until center of ham reaches 4° C.

E. For a limited number of pre-rigor carcasses (<10), sodium bicarbonate in saline solutions are perfused, via the iliac artery, into one pelvic limb (perfusing saline into the paired control limb, using identical procedures). This provides comparisons to test alternative delivery procedures for distributing food additives uniformly throughout the musculature. The limbs are chilled at 4° C. for 24 hr.

Partial data from Example 1 is presented in Tables 2–4 below:

Tables 2–4

Pre-rigor, postmortem longissimus lumborum pumped with NaHCO3 (1% by wt).

TABLE 2

Post-rigor parameters at different anatomical locations of muscle

| Location | CONTROL | | | TREATMENT | | |
|---|---|---|---|---|---|---|
| cranial end | pH | L* † | % Drip + | pH | L* † | % Drip + |
| 1 | 5.41 | 50.7 | 7.2 | 5.37 | 47.0 | 3.9 |
| 2 | 5.42 | 50.7 | 6.6 | 5.40 | 46.6 | 2.9 |
| 3 | 5.41 | 48.5 | 4.8 | 5.40 | 44.3 | 1.8 |
| 4 | 5.42 | 49.9 | 4.9 | 5.41 | 44.9 | 4.3 |
| 5 | 5.43 | 48.5 | 4.3 | 5.44 | 44.9 | 5.6 |

TABLE 3

Location about where pumping started on right side.
Measurements on treatment side were made in affected area.

| | | | | | | |
|---|---|---|---|---|---|---|
| 6 | 5.44 | 48.0 | 4.1 | 5.90 | 43.1 | 5.1 |
| 7 | 5.44 | 47.1 | 4.0 | 6.52 | 44.1 | 4.5 |
| 8 | 5.43 | 47.7 | 3.0 | 6.56 | 44.9 | 3.8 |
| 9 | 5.44 | 47.2 | 4.0 | 5.69 | 43.3 | 3.3 |
| 10 | 5.44 | 47.4 | 3.3 | 6.56 | 40.3 | 2.8 |
| 11 | 5.44 | 51.6 | 5.8 | 6.62 | 37.0 | 2.8 |
| 12 | 5.45 | 50.5 | 5.7 | 6.65 | 38.6 | 2.4 |
| 13 caudal end | 5.48 | 52.4 | 5.2 | 6.20 | 41.8 | 2.6 |

TABLE 4

Pre-rigor pH changes over time postmorten (pm)

| Time pm (min) | Left pH (CONTROL) | Right pH (TREATMENT) | Carcass T (° C.) |
|---|---|---|---|
| 30 | 6.23 | 6.18 | 39.5 |
| | | Injection of NaHCO3 | |
| 40 | 6.21 | 6.30 | 39.0 |
| 60 | 6.02 | 6.78 | 30.0 |
| 90 | 5.97 | 6.65 | 26.0 |
| 120 | 5.95 | 6.45 | 22.0 |
| 150 | 5.94 | 6.61 | 19.0 |
| 180 | 5.75 | 6.67 | 16.0 |
| 210 | 5.70 | 6.33 | 14.0 |
| 240 | 5.64 | 6.25 | 12.5 |
| 270 | 5.50 | 6.40 | 11.0 |
| 300 | 5.47 | 6.20 | 10.0 |
| 24 hr | 5.40 | 6.00 | 4.0 |

+ % drip was estimated from filter paper fluid
† L* values:
>50 = pale
43–49 = normal reddish-pink range
<43 = dark Example 2

Approximately one liter of a solution of 1% sodium bicarbonate and 0.7% NaCl was injected into the loin and ham muscles of 15 freshly slaughtered pigs. The loin and ham muscles were injected immediately after the animals had been stunned, bled, and skinned (about 15 minutes postmortem, pre-rigor). Data from the 15 pigs (including 12 PSE pigs) is shown in Table 5 below:

TABLE 5

| Pre-injection category | Post-injection category | No. of animals |
|---|---|---|
| PSE | RFN | 7 |
| PSE | RSE | 4 |
| PSE | DFD | 1 |
| RFN | DFD | 1 |
| RSE | RFN | 2 |

Some darkening (DFD condition) was seen at the site of injection. However, 7 of 15 samples were converted from unacceptable to acceptable quality, and another 2 from questionable to acceptable quality. These results have been extremely reproducible in duplicate experiments.

Samples of the muscles treated in this Example were broiled and taste-tested by a panel of volunteer graduate students. Overwhelmingly, the panel preferred the treated meat. The panel felt that the treated samples were much juicier and more tender than the untreated samples.

Example 3

Twenty stress-prone market pigs (possessing the gentic potential for producing PSE pork) were slaughtered over a period of three weeks. Pre-rigor ham and loin muscles from one side were removed immediately after bleeding and injected with a sodium bicarbonate solution (TREATMENT). Identical muscles from the opposite side were left intact for 24 hours under conventional processing procedures and then the muscles were removed (CONTROL). Light reflectance, % drip, and pH were measured on the muscles to establish quality classes. Taste panel evaluations were made to determine effect of treatment on palatability traits. Table 6 provides a summary of the results. The treatment changed the classification of all samples from PSE to RFN, and the flavor was not inversely influenced by inclusion of sodium bicarbonate.

TABLE 6

Influence of Injecting Sodium Bicarbonate into Pre-Rigor Pork Musculature

|  | CONTROL | TREATMENT |
|---|---|---|
| pH | 5.3 | 5.6** |
| L* | 53.5 | 46.5** |
| % Drip | 10.0 | 4.5** |
| Quality Class | PSE | RFN |
| Tenderness Score | 47 | 52 |
| Juiciness Score | 52 | 55 |
| Flavor Score | 47 | 56* |

*$P < 0.05$
**$P < 0.01$
$N = 20$
L* values:
>50 = pale in color
43–50 = reddish pink
<43 = dark
Panel scores range from 1 (very tough, very dry, or very undesirable flavor) to 100 (very, very tender, very juicy, or very desirable flavor).

What is claimed is:

1. A method of improving the color, water-holding capacity, and organoleptic qualities of pork, beef, lamb, veal, and poultry comprising injecting or perfusing a solution of sodium bicarbonate having a concentration of from about 0.1 molar to about 1.0 molar into a swine, cattle, sheep, or fowl carcass prior to the onset of rigor mortis.

2. The method according to claim 1, wherein the sodium bicarbonate solution also includes sodium chloride at a concentration of about 1% or less.

3. The method according to claim 1, further comprising the step of simultaneously injecting or perfusing sodium pyrophosphate into the carcass.

4. The method according to claim 1, wherein the solution of sodium bicarbonate is injected into a swine carcass.

5. The method according to claim 1, wherein the solution of sodium bicarbonate is perfused into the carcass.

6. A method of decreasing the amount of PSE-grade pork from a swine carcass comprising injecting or perfusing a solution of sodium bicarbonate having a concentration of from about 0.1 molar to about 1.0 molar into the carcass prior to the onset of rigor mortis.

7. The method according to claim 6, wherein the sodium bicarbonate solution also includes sodium chloride at a concentration of about 1% or less.

8. The method according to claim 6, further comprising the step of simultaneously injecting or perfusing sodium pyrophosphate into the carcass.

9. The method according to claim 6, wherein the solution of sodium bicarbonate is injected into the carcass.

10. The method according to claim 6, wherein the solution of sodium bicarbonate is perfused into the carcass.

11. A method of decreasing the amount of PSE-grade pork from a swine carcass comprising injecting or perfusing a buffered solution of about 0.1 to about 0.5 molar sodium bicarbonate into the carcass prior to onset of rigor mortis.

* * * * *

Disclaimer 6,020,012—Robert G. Kauffman, Madison; Marion L. Greaser; Middleton, both of Wis.; Edward Pospiech, Paznan, Poland; Ronald L. Russell, Brooklyn, Wis. METHOD OF IMPROVING THE WATER-HOLDING CAPACITY, COLOR, AND ORGANOLEPTIC PROPERTIES OF BEEF, PORK, AND POULTRY. Patent dated February 1, 2000. Disclaimer filed March 19, 2003, by the assignee, Wisconsin Alumni Research Foundation, Madison, Wis.

The term of this patent shall not extend beyond the expiration date of Pat. No. 6,020,012.

*(Official Gazette, July 15, 2003)*